April 28, 1953     J. FEIGLEY ET AL     2,636,303
TIP-UP FOR ICE FISHING
Filed March 1, 1950     2 SHEETS—SHEET 1
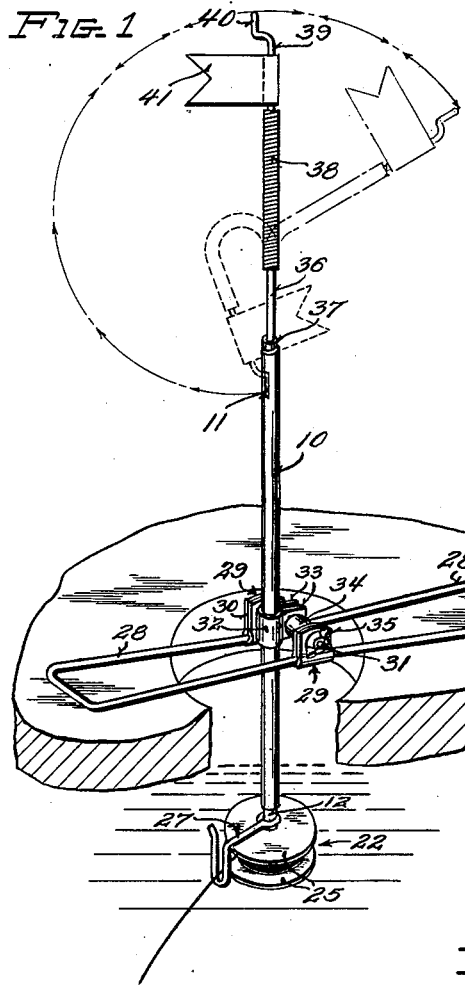
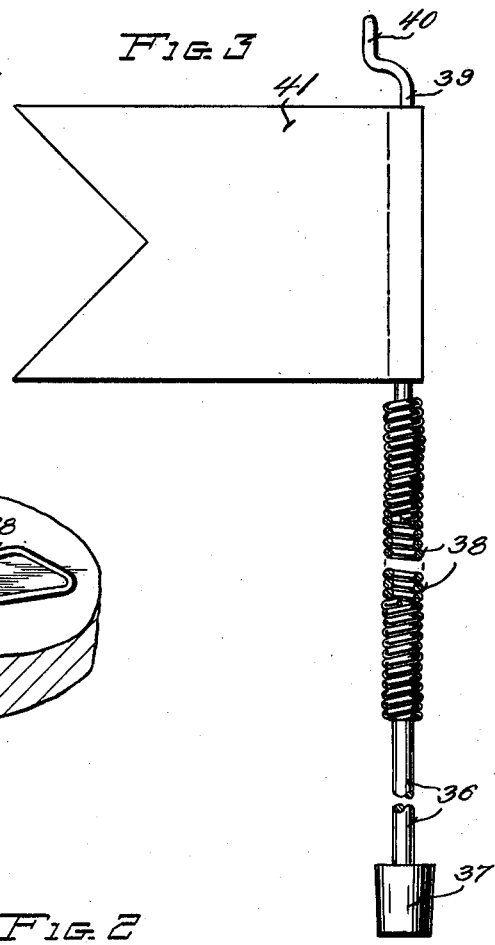
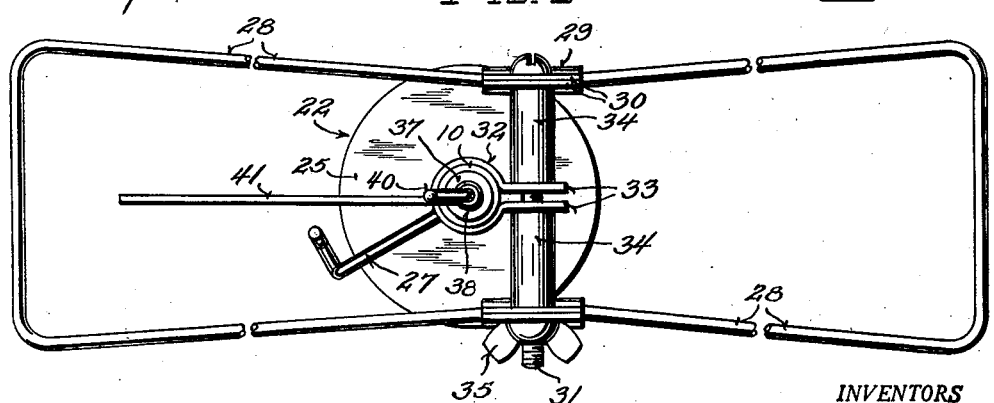
INVENTORS
JOSEPH FEIGLEY
JOHN E. PIERCE JR.
BY
ATTORNEY April 28, 1953 J. FEIGLEY ET AL 2,636,303
TIP-UP FOR ICE FISHING
Filed March 1, 1950 2 SHEETS—SHEET 2
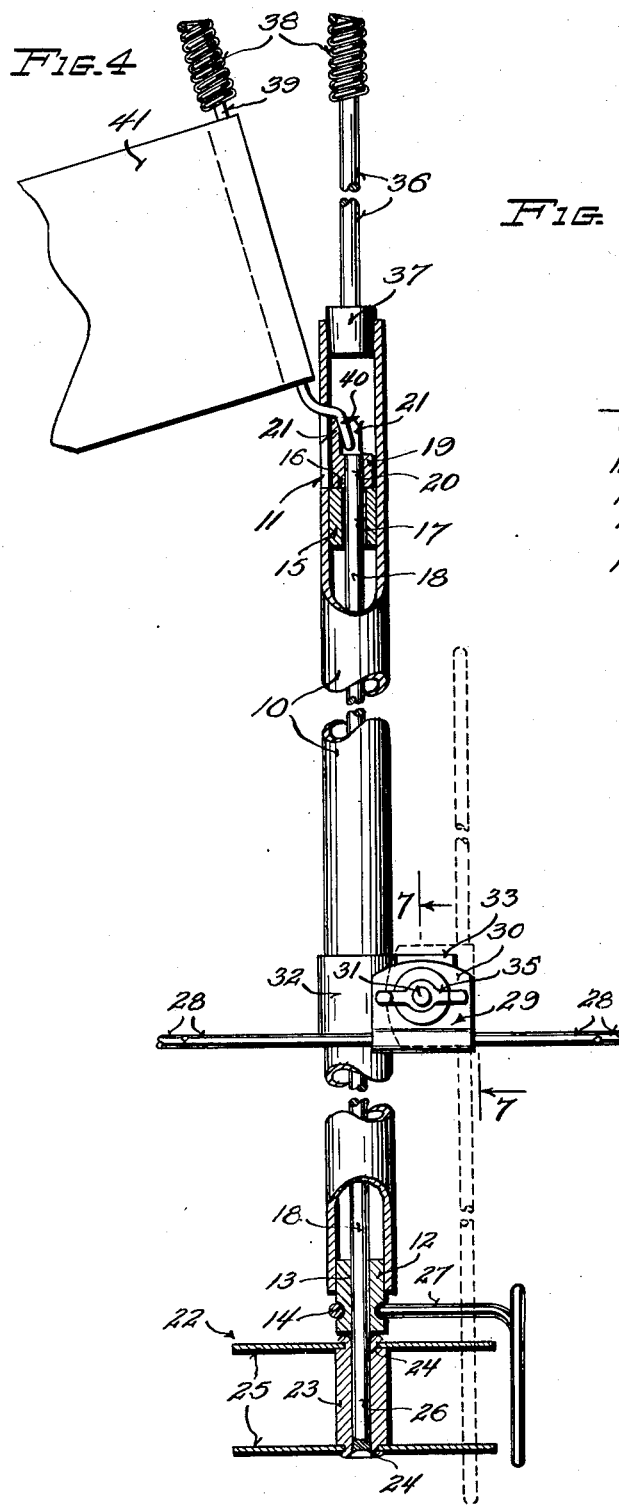
INVENTORS
JOSEPH FEIGLEY
JOHN E. PIERCE Jr.
BY
ATTORNEY Patented Apr. 28, 1953

2,636,303

UNITED STATES PATENT OFFICE 2,636,303

TIP-UP FOR ICE FISHING

Joseph Feigley and John E. Pierce, Jr.,
Wauwatosa, Wis.

Application March 1, 1950, Serial No. 146,961

10 Claims. (Cl. 43—17)

This invention relates to a tip-up for ice fishing and more particularly to that type of tip-up in which the signal flag assembly includes a flexible portion adapted to be bent to permit the free end of the flagstaff to be inserted into an aperture in the body portion of the device where it is engaged by a rotatably mounted cam latch or keeper to releasably retain the signal flag in lowered cocked or latched position until such time as a fish takes the bait and the engagement of the cam latch with the free end of the flagstaff is released to permit the automatic raising of the flag, under the action of the flexed portion of the staff, into a waving vertical position to signal the catch of a fish on the line.

The primary object of the present invention resides in the provision of a new and improved automatic tip-up device which includes a signal flag assembly mounted on the upper end of the body portion of the device and having a flexible portion in the flagstaff which permits the signal flag to be swung downwardly with the free end of the staff releasably retained in a lowered cocked or latched position, in the proximity of the top of the body portion, under the action of a latch or keeper element.

Another object of the invention resides in the provision of a new and improved automatic tip-up device which includes a rotatably mounted cam, latch or keeper, housed within the body position of the device, that may be manually positioned to engage the free end of the signal flagstaff to releasably retain the signal flag in a lowered cocked position and that is automatically responsive to the rotation of the reel in paying out line to a fish which has taken bait connected to said line to effect the release of the latching engagement with the free end of the signal flagstaff to permit the flag to swing into a vertical waving position, under the influence of the flexed portion of the flagstaff, to signal the catch of a fish on the line.

Another object of the invention resides in the provision in a tip-up device of new and improved means for releasably retaining the body portion of the device in a desired position of vertical adjustment with respect to the supporting structure.

Another object of the invention resides in the provision in a tip-up device of new and improved means for altering the angular position of the body portion of the device with respect to the supporting structure so that the body portion may be swung into its extended or vertical position when set up for use, or swung into its collapsed or horizontal position for transporting or storage.

Another object of the invention resides in the provision in a tip-up device of a detachably mounted signal flag assembly which may be applied to or removed from the upper end of the body portion of the device at will to reduce the overall size of the device for storage purposes.

A further object lies in the provision in a tip-up device of a new and improved line guide which is independently mounted for free rotation with respect to a fish line reel.

Other objects and advantages will become apparent from the following description of an illustrative embodiment of the present invention shown in the accompanying drawings.

In the drawings.

Figure 1 is a perspective view of a tip-up device for ice fishing, constructed in accordance with the teachings of the prevent invention, set up for use, showing the signal flag in a lowered latched position in dotted lines and in a vertical waving released position in full lines, signalling a catch on the line;

Fig. 2 is an enlarged top plan view of the tip-up shown in Fig. 1;

Fig. 3 is a fragmentary elevational view of the removable signal flag assembly;

Fig. 4 is an enlarged fragmentary elevational view of the tip-up device partially in section to disclose structural details of the various elements and showing the signal flag in a lowered latched position and the supporting frame swung from its active position shown in full lines into its storage or transporting position shown in dotted lies;

Fig. 5 is an enlarged fragmentary view of the upper end of the body portion of the tip-up showing the cam latch or keeper rotated into a signal flag releasing position;

Fig. 6 is an enlarged horizontal sectional view taken substantially on the line 6—6 of Fig. 5 with the latch cam shown in a flag releasing position in full lines and in a flag latching position in dotted lines; and Fig. 7 is a vertical sectional view taken substantially on the line 7—7 of Fig. 4 showing the mounting means for releasably retaining the body portion of the device in a desired position of vertical adjustment with respect to the supporting frame.

The automatic tip-up chosen for illustrative purposes in the accompanying drawings is constructed in accordance with the teachings of the present invention and comprises a tubular body portion 10 having an axially disposed slot or aperture 11 cut in its wall adjacent the upper end of the tube. A bushing 12 having an axial bore 13 and an annular groove 14 is pressed into the lower end of the tube 10. The bushing 12 is positioned in a manner that the annular groove 14 lies below the lower end of the tube 10 for a purpose to be hereinafter described. A second bushing 15 is pressed into the upper end of the tube 10 and forced downwardly to a position in which its top surface 16 lies adjacent the lower end of the slot 11. The bushing 15 is further provided with an axially disposed bore 17. A latch shaft 18 is journalled for free rotary movement in the aligned bores 13 and 17 of the respective bushings 12 and 15, and it should be noted, at this point, that the size of the bore 13 is such as to provide a close free-running fit for the shaft 18; while the bore 17 provides a fairly loose fit for the shaft 18 to insure against any binding action which might deter the free operation of the latch mechanism which is attached to the upper end of the shaft 18.

The latch mechanism comprises a head 19 having an axial bore 20 adapted to receive the upper extremity of the shaft 18 which is secured therein by any appropriate means, such as brazing or soldering. The head 19 is also provided with an upwardly directed arcuately shaped cam portion 21. Referring to Figs. 4, 5 and 6, it will be noted that the cam portion 21 of the latch mechanism is slightly greater than half of the circumference of the head 19 and that the top and end surfaces of the cam portion 21 are smoothly rounded; this construction insures proper operation of the latch mechanism in a manner to be later referred to.

A reel 22, for the fishing line, comprises a hub 23 having reduced ends 24 on which a pair of discs 25 are mounted in spaced relationship with respect to each other by applying the central opening in one disc 25 to one reduced end 24 and the other disc 25 to the opposite end 24 and swaging them in place against the shoulders formed by the reduced portions to retain them securely in parallel spaced relationship. The reel 22 is applied to the lower extremity of the shaft 18 which projects below the bottom of the bushing 12 by inserting the end of the shaft 18 into an axial bore 26 formed in the hub 23 and is secured therein by any appropriate means, such as brazing or soldering.

A line guide 27 in the form of bent wire has one end wrapped around the groove 14 formed in the bushing 12 in a manner to permit its free rotation with respect to the bushing 12 while the groove 14 serves to retain it in proper relationship with the reel 22. The guide 27 extends radially from the bushing 12 to a point beyond the periphery of the discs 25 of the reel where it is bent downwardly at substantially a right angle with respect to the radially disposed portion of the guide. The downwardly disposed portion of the guide extends below the lower disc 25 where it is formed with a sharp reverse bend to provide an upwardly directed portion which lies parallel to the downwardly directed portion and in spaced relationship therewith to form a guide for the fish line which passes between the parallel portions of the line guide 27 as it leaves the reel 22 and runs on out to the sinker and bait. The purpose of the line guide 27 is virtually self explanatory, since it provides a simple and effective means for insuring the proper operation of the reel by preventing the snarling or tangling of the line as it is paid out by or wound onto the reel.

The supporting structure for the body portion 10 of the tip-up comprises a substantially rectangular open frame having a length approximating the length of the body portion 10 of the device and a width sufficient to give the desired stability to the device when it is set up for use. The supporting frame comprises a pair of U-shaped bent wires 28 having their ends secured in mounting plates 29 formed of sheet metal bent around the frame wires 28 and having upstanding flanges 30 provided with aligned holes for receiving a clamping bolt 31. After the plates 29 are properly formed, the ends of the frame wires 28 may be inserted into them and secured in position by brazing or soldering to complete the structure and provide a stiff and sturdy supporting frame on which the body portion 10 may be adjustably mounted.

The adjustable mounting for the body portion 10 includes an open sided clamp ring 32 having a pair of outwardly projecting parallel ears 33 which lie in spaced relationship with each other and are provided with aligned holes adapted to receive the clamping bolt 31. A pair of spacer collars 34 are mounted on the clamping bolt 31 and are arranged so that each has an end in abutting contact with the outer side on one of the ears 33 while the remaining end of each collar lies adjacent the inner surface of one of the upstanding flanges 30 formed on the mounting plates 29. With the several parts in the positions indicated, the clamping bolt 31 may be passed through the aligned openings in each of the elements and a wing nut 35 may be applied to the threaded end of the bolt 31. With the wing nut 35 loosened, the body portion 10 of the device may be slid upwardly or downwardly through the clamp ring 32 to properly adjust the body portion with respect to the supporting frame to compensate for the varying thicknesses of the ice encountered at different times or on different bodies of water. After proper adjustment of the body portion 10 with respect to the supporting frame has been made to insure proper depth of the reel 22 in the water, care should be taken to see that the body portion of the device is perpendicular to the supporting frame and the wing nut 35 may then be tightened to releasably retain the body portion 10 and supporting frame in a desired position.

The signal flag assembly comprises a stiff metal rod 36 having a head 37 secured to its lower end for removable application to the open upper end of the tubular body portion 10. A flexible element in the form of a tightly wound coil spring 38 has one end attached to the top of the rod 36 and the other end of the coil spring 38 is secured to the lower end of a flag staff 39. The upper extremity of the flag staff 39 is bent outwardly and terminates in an upstanding rigid end or catch 40 which is offset from the remaining portion of the flagstaff 39. The assembly is completed by the application of a signal flag 41, of felt or other suitable material, secured on the flagstaff 39 by stitching or stapling.

A brief description of the operation of the device will serve to emphasize its simplicity and advantages in comparison with other tip-up devices now in common use. At the outset, it should be noted that all of the operating parts of the device are formed of rust resistant or rust-proof material to insure long life and proper operation of the device in spite of the fact that, due to the very nature of its use, it is subjected to frequent partial immersion in water for considerable lengths of time. After the supporting structure has been swung into proper position and the body portion releasably retained in the desired vertical adjustment with respect to the supporting structure, the flag assembly may be installed in the upper end of the body portion 10 by inserting the head 37 into the open upper end of the tube 10. When installing the signal flag assembly, care should be taken to note that the offset upper end or catch 40 at the top of the flagstaff 39 is on the same side and in vertical alignment with the slot 11 formed in the tube 10. After the hook is baited and the line paid out the amount required for the chosen depth for fishing, the flexible portion or coil spring 38 is bent downwardly to permit the upper end of the flagstaff or catch 40 to be introduced into the slot 11 in the body portion 10. With the flagstaff 39 held in the position indicated in Fig. 4 of the drawings, the reel 22 may be partially rotated to a position in which the upstanding arcuately shaped cam portion 21 lies between the catch 40 on the end of the flagstaff 39 and the slot 11 to effect the releasable retention of the signal flag in lowered or latched position. The device is now ready for use and may be positioned over the fishing hole in the usual manner. When a fish strikes the bait and begins to swim away with it, the reel 22 rotates in response to the paying out of the line and since the reel 22 and the latch mechanism are both anchored securely on the latch shaft 18; rotation of the reel 22 causes the cam portion 21 of the latch mechanism to rotate; with the result that the cam portion 21 moves out of engaging contact with the catch 40 and simultaneously uncovers the slot 11 to permit the free end of the flagstaff 39 to be whipped out of the slot 11 under the influence of the flexed coil spring 38 which causes the signal flag 41 to be waved in its raised position, signalling the catch of a fish on the line. The waving of the signal flag 41, in its vertical position, under the action of the flexed coil spring 38 as it regains its normally straight position, will attract the attention of the fisherman and apprise him of the fact that this particular line needs immediate attention.

From the foregoing detailed description of the construction and operation of the tip-up constructed in accordance with the teachings of the present invention, it will readily be understood that a simple and effective device has been provided that is capable of carrying out the several objects of the invention as set forth at the beginning of the specification.

While the invention has been described in considerable detail with regard to the particular embodiment chosen for illustrative purposes in the accompanying drawings, it is to be understood that various changes may be made in its embodiment without departing from or sacrificing any of the advantages hereinafter claimed.

We claim:

1. An automatic tip-up for ice fishing comprising, a tubular body portion, a signal flag assembly mounted on the upper end of said body portion, said assembly including a flag, a flexible member having a rigid free end, an axially disposed slot in the wall of said body portion, a longitudinally disposed shaft rotatably mounted in said body portion, a latch cam secured to the upper end of said shaft and disposed in a cooperating relationship with said slot and manually rotatable to engage said free end of said flag assembly to releasably retain the same in a lowered or latched position upon the bending of said flexible member and the introduction of said free end into said body portion through said slot, a fish line reel secured to the lower end of said shaft, said latch cam being adapted to rotate in response to rotation of said reel in paying out line having a bait attached thereto to a fish after it has taken the bait to effect the automatic release of the latching engagement of said cam with said free end of said flag assembly to permit said signal flag to swing into a vertical waving position under the action of the flexed member of said assembly to thereby indicate the catch of a fish on the line.

2. An automatic tip-up for ice fishing constructed as set forth in claim 1, in which the signal flag assembly is removably secured on the upper end of the body portion by means on the assembly.

3. An automatic tip-up for ice fishing constructed as set forth in claim 1, in which the flexible member of the signal flag assembly is a coil spring.

4. An automatic tip-up for ice fishing constructed as set forth in claim 1, in which the rigid free end of the flexible member of the signal flag assembly is laterally offset from the remaining portion thereof.

5. An automatic tip-up for ice fishing constructed as set forth in claim 1, in which the latch cam is arcuately shaped.

6. An automatic tip-up for ice fishing comprising, a body portion, a signal flag assembly mounted on the upper end of said body portion, said signal flag assembly including a flag, a flexible member having a rigid free end, a shaft rotatably mounted in said body portion, an aperture in the wall of said body portion, said shaft having its upper end disposed adjacent said aperture and its lower end extending beyond the lower extremity of said body portion, a keeper secured to the upper end of said shaft, a fish line reel secured to the lower end of said shaft, said aperture being adapted to receive said rigid free end of said flag assembly upon the bending of said flexible member and the introduction of said free end into said aperture, said keeper being rotatable by manual turning of said reel to engage said free end of said flag assembly to releasably retain said flag assembly in a cocked, lowered latched position, said keeper being adapted to rotate in response to rotation of said reel in paying out line having a bait attached thereto to a fish after it has taken the bait to effect the automatic release of the latching engagement of said keeper with said free end of said signal flag assembly to permit said signal flag to swing into a vertical waving position under the action of said bent flexible portion to thereby indicate the catch of a fish on the line.

7. An automatic tip-up for ice fishing constructed as set forth in claim 6, in which the signal flag assembly is removably mounted on the upper end of the body portion by means on the assembly.

8. An automatic tip-up for ice fishing constructed as set forth in claim 6, in which the flexible member of the signal flag assembly is a coil spring.

9. An automatic tip-up for ice fishing comprising, a tubular body portion, a removable signal flag assembly forming a closure for the upper end of said body portion, said assembly including a flag, a flexible member having a rigid free end, a bushing mounted in the lower end of said body portion, a line guide journalled for free rotation on said bushing, a second bushing in said body portion, said second bushing being positioned intermediate the ends of said body portion, a shaft journalled for free rotation in said bushings, an aperture in the wall of said body portion located above the upper end of said second bushing, a latching device housed within said body and secured to the upper end of said shaft, a fish line reel secured to the lower end of said shaft, said latching device being rotatable by manual turning of said reel to engage said free end of said flag assembly to releasably retain the same in a lowered cocked latched position upon bending of said flexible member and the introduction of said free end into said body portion through said aperture, said latching device being adapted to rotate in response to rotation of said reel in paying out line having a bait attached thereto to a fish after it has taken the bait to effect the automatic release of the latching engagement of said latching device with said free end of said flag assembly to permit said signal flag to swing into a vertical waving position under the action of said flexed portion of said assembly to thereby signal the catch of a fish on the line.

10. An automatic tip-up for ice fishing constructed as set forth in claim 9, in which the flexible member of the flag assembly is a coil spring.

JOSEPH FEIGLEY.
JOHN E. PIERCE, Jr.

References Cited in the file of this patent

UNITED STATES PATENTS

| Number | Name | Date |
|---|---|---|
| 2,193,747 | Thompson | Mar. 12, 1940 |
| 2,198,286 | Krivutza | Apr. 23, 1940 |
| 2,255,352 | Greenquist et al. | Sept. 9, 1941 |
| 2,448,346 | Baugh et al. | Aug. 31, 1948 |
| 2,451,693 | Richards | Oct. 19, 1948 |